Aug. 28, 1956     A. T. SMITH     2,760,799
JOINT STRUCTURE FOR A MULTIPLE TOOL
Filed April 26, 1954
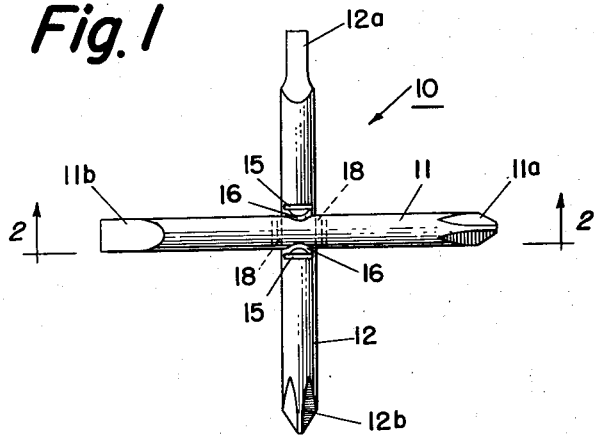
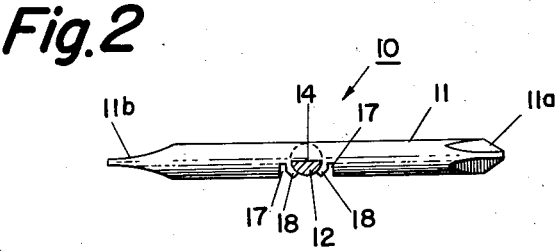
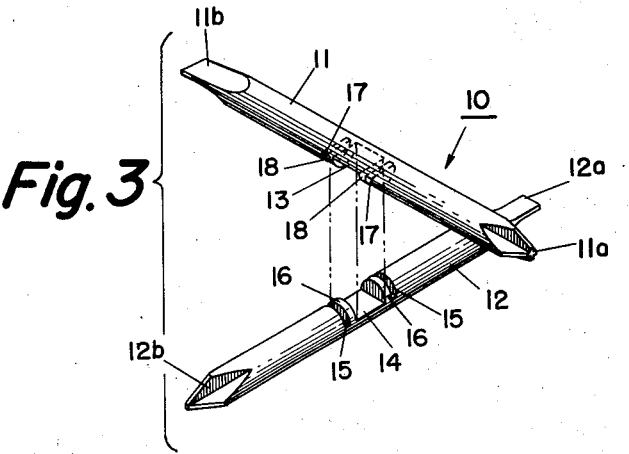
INVENTOR.
ALVA T. SMITH
BY *Joseph Rosman*
ATTORNEY

United States Patent Office 2,760,799
Patented Aug. 28, 1956

2,760,799
JOINT STRUCTURE FOR A MULTIPLE TOOL

Alva T. Smith, Milwaukee, Wis., assignor to The Alva T. Smith Company, Milwaukee, Wis., a corporation of Wisconsin Application April 26, 1954, Serial No. 425,540

2 Claims. (Cl. 287—51)

This invention relates to a multiple tool. More specifically, the invention relates to a multiple tool formed of two cross-members which are spliced at their intersecting portions by a cross-lap joint.

Further details and advantages of my invention will be apparent from the following specification and appended drawing, wherein Figure 1 is a plan view of the multiple tool construction, Figure 2 is a sectional view taken on lines 2—2 of Figure 1, and Figure 3 is a perspective view of the two separate cross-members.

Referring to the drawings, my multiple tool is formed of two separate metal rods or cross-members 11 and 12, as illustrated in Figure 3, preferably of the same diameter and which are suitably notched at their middle portions 13 and 14, respectively, so as to permit the cross-members 11 and 12 to be positioned in intersecting and spliced relation, as shown in Figure 1, to form a cross-lap joint or blind-halved lap. The dimensions and depth of the notches 13 and 14 are proportioned so that the cross-sectional thickness of the crossed-members 11 and 12 at their point of intersection is substantially the same as each of the individual members, as shown in Figure 2, so as to form a so-called blind-halved lap. The rod members may be made for example of ¼" metallic rods. A pair of grooves 15 are provided in rod 12 adjacent the sides of notch 14, as shown in Figure 3, extending to a depth substantially the same as the depth of notch 14. These grooves 15 thus provide upstanding portions 16 having a function as will be described later. Similarly, a pair of grooves 17 are provided in rod 11 adjacent the sides of notch 13, as shown in Figure 3, extending to a depth substantially the same as the depth of notch 13. These grooves 17 thus provide upstanding portions 18.

The separate cross-members 11 and 12, as shown in Figure 3, are assembled by positioning them in intersecting and interlocking position to assume the position shown in Figure 1. The upstanding portions 16 are then suitably bent over under suitable pressure to conform to the adjacent curvilinear contour of cross-member 11 and in tight engagement therewith.

Likewise upstanding portions 18 are suitably bent over to conform to the curvilinear contour of adjacent cross-member 12. The bent over portions 16 and 18 thus serve as locking elements for retaining the cross-members 11 and 12 in fixed and permanently interlocked relation.

The ends of the cross-members 11 and 12 may be shaped or formed into any suitable tools, such as four different types or sizes of screw drivers, as shown in Figure 1. For example, the end 11a is a Phillips screw driver, the ends 11b and 12a are slot-type screw drivers, and the end 12b is a Frearson-type screw driver. Obviously, the bits or ends of the members 11 and 12 may be formed into any other desired tools, such as small knives, chisels, awls, and the like. It is also to be understood that the cross-sectional contour or shape of the cross-members may be circular or of any other desired contour, such as oval, rectangular, etc.

If desired, a plastic material of suitable contour and dimensions may be molded at the region of the intersecting portions of the cross-members to facilitate use of same.

My invention affords a number of distinct advantages over prior multiple tool constructions. By splicing the cross-members by means of a cross-lap joint and the bent-over locking elements, a strong and permanent joint is thus provided which eliminates the need for welding the cross-members.

It is to be understood that the invention is not restricted to the precise details of the foregoing description of an illustrative embodiment of my invention and that modifications and changes may be made within the ordinary ability of one skilled in this art which are intended to be included within the scope of the appended claims.

I claim:

1. In a multiple tool comprising intersecting cross-members, the improvement comprising a joint at the intersecting portions of said cross-members formed by mating cross-laps in each of said cross-members formed by complemental notches in the intersecting portions of said cross-members and locking portions adjacent said notches integral with each of said cross-members formed by grooves spaced from said notches and folded over into secure locking engagement with the adjacent intersecting cross-member.

2. A multiple tool as defined in claim 1, wherein the grooves extend to substantially the same depth as the complemental notches.

References Cited in the file of this patent

UNITED STATES PATENTS

| | | |
|---|---|---|
| Wrench | Blake et al. | Dec. 14, 1830 |
| 857,724 | Dean | June 25, 1907 |
| 963,218 | Gilmore | July 5, 1910 |
| 1,213,498 | Johnson et al. | Jan. 23, 1917 |
| 1,620,846 | Wells | Mar. 15, 1926 |
| 1,678,362 | Sloan | July 24, 1928 |

FOREIGN PATENTS

| | | |
|---|---|---|
| 840,110 | Germany | May 29, 1952 |